Figure 1:
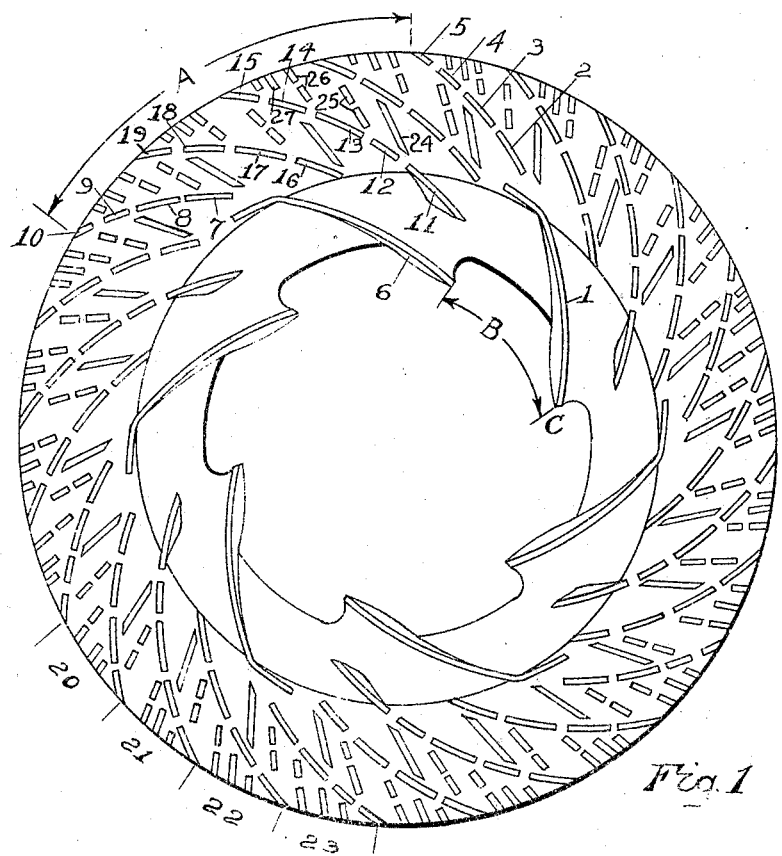

Oct. 13, 1925.

H. B. NELSON

GRINDING BURR

Filed May 29, 1922

1,556,870

Harry B. Nelson INVENTOR

Geo. B. Willey ATTORNEY

Patented Oct. 13, 1925.

1,556,870

UNITED STATES PATENT OFFICE.

HARRY B. NELSON, OF SAGINAW, MICHIGAN.

GRINDING BURR.

Application filed May 29, 1922. Serial No. 564,484.

*To all whom it may concern:*

Be it known that I, HARRY B. NELSON, a citizen of the United States, residing at Saginaw, in the county of Saginaw and State of Michigan, have invented certain new and useful Improvements in Grinding Burrs; and I do hereby declare the following to be a full, clear, and exact description of the invention, such as will enable others skilled in the art to which it appertains to make and use the same.

This invention relates to grinding machines and pertains more particularly to that class of grinders known as disk grinders, in which the material to be ground is fed radially outward from near the center of a pair of annular disks set face to face. The ground material is discharged from the disks at their periphery. The grinding or cutting action takes place between sets of raised ribs or projections formed on the opposing faces of the disks. The outer surfaces of the ribs on each disk being machined to the same height, the cutting or grinding edges of all of the projections on the disk lie in the same plane and accurately meet the working faces of the projections on the opposing disk.

My invention pertains more particularly to an improved combination and arrangement of the sets of shearing faces or baffles on each disk whereby the objects of my invention are attained.

These objects are, first, to provide on a grinder disk a plurality of groups of cutting or grinding projections, each group occupying a certain portion, say one-sixth, of the working area of the disk, and the projections and baffles comprising each group arranged to guide the material in its outward travel across the working surface of the disk in such a manner that while traveling outwardly the material will be repeatedly cut and recut by shearing action of the working edges of the projections and baffles. The arrangement and relative angular locations of the projections are such that when duplicate disks made according to my improved construction are placed face to face, the groups of projections and most of the individual projections comprising each group will be directed clockwise on one of the disks and counter-clockwise on the opposing disk. The arrangement of each group and that of its component projections being in general spiral, there results an improved new function of the machine which will now be described.

This new function is to cause each particle of the material to be subjected to repeated shearing actions and to cause such shearing action to occur whenever the particle in its outward travel encounters any one of the numerous baffles or projections comprising one of the unit groups above described.

To that end, I so arrange the guiding projections and the baffles between them that when duplicate disks operate together, one of them stationary and the other revolving at high speed, the material will be driven from the center of the annulus to its periphery, and whenever in its travel a baffle or projection on one of the disks is encountered, the material will immediately be caught with a scissorlike movement by one of the projections on the other disk and the particles of material will be sheared in two, instead of being merely rolled around and finally driven out on the periphery of the disks in a partially cut condition as heretofore, requiring a second passage through the machine.

I have found in practice that the improved arrangement of baffles and projections herein described requires less power for a much greater hourly output than is required with former baffle and projection arrangements in which the shearing action above referred to is not attained in so complete a measure, owing to the relatively small amount of shearing action that takes place.

My arrangement of baffles whereby the material is made to travel outwardly in a substantially spiral direction and is subjected to shearing action of an oppositely directed spiral system immediately it comes in contact with one of the projections is, therefore, an improved feature of my invention which comprises the devices herein described and claimed and the equivalents thereof.

In the drawings, Fig. 1 is a face view of a grinding disk embodying my improved arrangement of baffles and projections.

Figure 2:
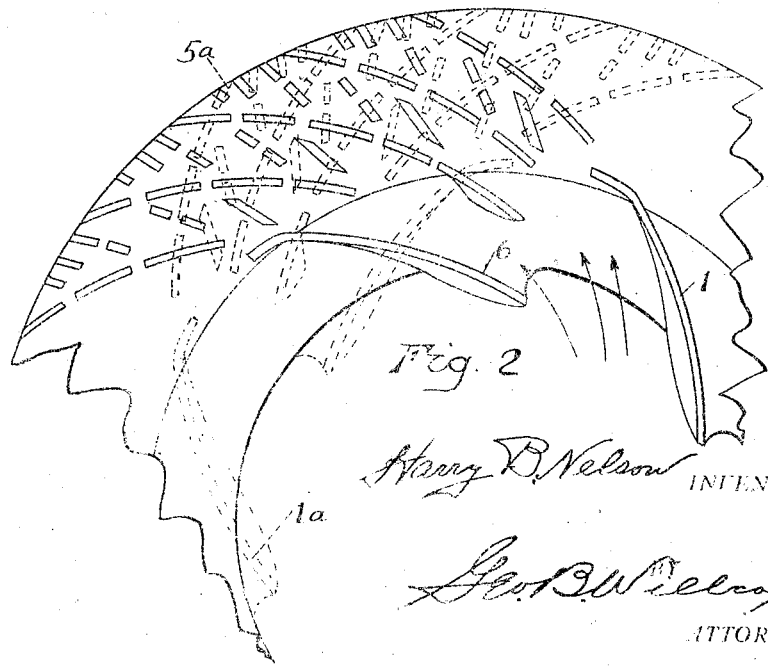

Fig. 2 is a similar fragmentary view, showing also by dotted lines, the relative arrangement of the projections on an opposing plate, which is preferably a duplicate of the first.

As is clearly shown in the drawings, each annular disk which in general construction is the same as is usually employed in disk grinding machines, carries on its working face a plurality of units, preferably six, each comprising a group of projecting members, the top surfaces of which are ground off to the same level, so that the edges of the projections comprise shearing edges when two similar disks are placed face to face, one of the disks being stationary and the other revolved, or, if preferred, both disks may be revolved in opposite directions, or both may be revolved in the same direction, but one faster than the other.

Considering any one group, as for example, that included by the arc A on the outer circumference of the annular disk, and the corresponding inner arc as B, on the inner circumference, it will be noticed that the group is disposed in general in a somewhat fanlike formation, the apex being at C, one side bounded by the spirally curved row of projections 1, 2, 3, 4, 5 and the other side formed by a row 6, 7, 8, 9, 10. Between these two outer rows of projections and arranged so as to equally divide the intervening area into spirally disposed sectors are other rows of projections, as for example, a central row 11, 12, 13, 14, 15 and two flanking rows as 16, 17, 18, 19. If three intermediate rows are used, as herein illustrated, four spirally disposed channels or passageways are thereby established, as 20, 21, 22, 23, which channels I have designated for convenience on one of the other unit groups.

In each channel a plurality of projections are located, which for convenience I designate as baffles 24, 25, 26, 27, extending diagonally across their spiral channel and lying in a position substantially radial with respect to the apex C as a center.

Any one of the baffles may be made either in a single piece, as 24, or in more than one piece, as at 25.

Considering now the operation of these projections, reference may be had to Fig. 2, where the dotted lines show the positions of the projections on the second plate with respect to those on the first plate. The relative movement of the plates is in opposite directions, that is, the plate or disk shown in full lines may be stationary and the one indicated by dotted lines may be revolved counter-clockwise, or the first may be revolved clockwise and the second plate counter-clockwise, or both plates may be revolved in the same direction, but at different speeds. I prefer, however, to follow the usual practice in grinding machines of this character, and employ one stationary plate and one revolving plate.

Material is fed, as indicated by the arrows in Fig. 2, into the space between projections 1 and 6, which are in effect outstanding ribs carried by the annular disk. The material is swept into the space between the disks by the spirally arranged advancing projections 1ª—5ª on the opposite plate, the movement being substantially that of a sweep or scraper, or of a crumb tray on a table cloth and the effect being to drive the material in a general outward direction and at the same time subject it to the shearing action of the baffles on the opposing plates. The baffles are oppositely directed, as shown in Fig. 2, that is to say, the spiral arrangement of baffles on one plate is opposed in direction to that of the baffles on the opposing plate.

As the material progresses outward across the annular working face of the disk and as it becomes cut into finer and finer particles the volume increases. Likewise the spread or distance apart of the rows of baffles, or in other words, the width of the channel, as 20, increases. The velocity of the material outward is thereby maintained substantially constant, although the volume of the material increases as it travels across the face of the annular disk.

By the means above described I have produced a simple, yet exceedingly effective arrangement of baffles and spirals, whereby the shearing or cutting capacity of the disks is greatly increased and the power required for cutting is reduced while the output of the machine is in practice almost doubled as compared with the output of disks having groups of baffles arranged parallel.

Having thus described my invention, what I claim and desire to secure by Letters Patent is:

In a grinding disk, spirally disposed longitudinally interrupted ribs including channels therebetween, a plurality of series of baffles located in and extending diagonally across each of said channels, the individual baffles of each series spaced apart endwise from each other and positioned substantially radially with respect to the apex of said spiral channel as a center.

In testimony whereof, I affix my signature.

HARRY B. NELSON.